UNITED STATES PATENT OFFICE.

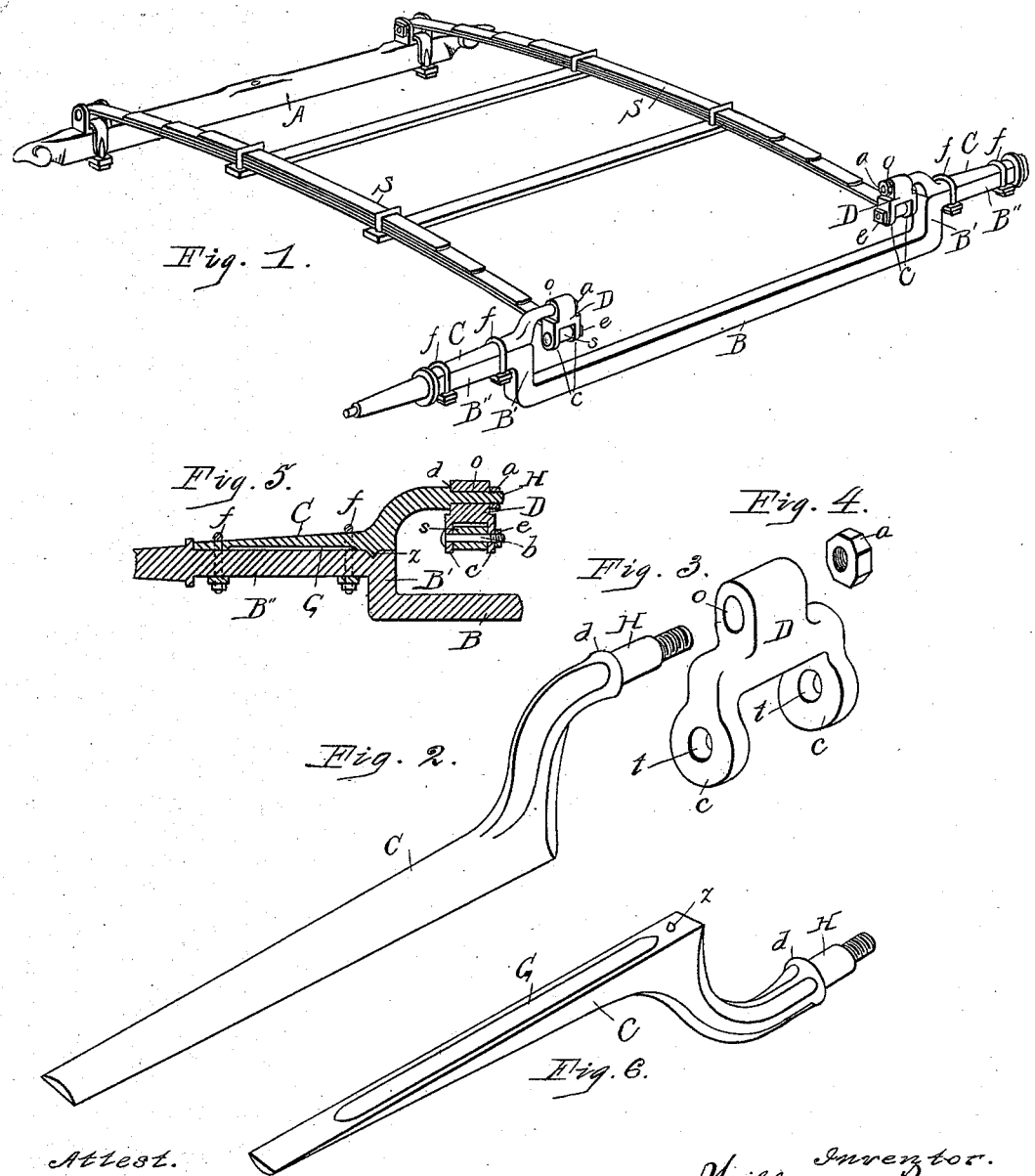

WILLIAM D. RUMSEY, OF DETROIT, MICHIGAN.

VEHICLE RUNNING-GEAR.

SPECIFICATION forming part of Letters Patent No. 413,969, dated October 29, 1889.

Application filed April 8, 1889. Serial No. 306,462. (No model.)

*To all whom it may concern:*

Be it known that I, WILLIAM D. RUMSEY, a citizen of the United States, residing at Detroit, in the county of Wayne and State of Michigan, have invented certain new and useful Improvements in Vehicle Running-Gear; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to vehicle running-gear; and it consists in a certain construction and arrangement of parts enabling the employment of side springs for supporting the vehicle-body and providing for the longitudinal expansion of the springs when sustaining the weight of the occupants of the vehicle, bringing the end bearings of the springs directly over the vertical center of the axle, and relieving the axle from the twisting side strain incident to the employment of side springs as in common use, all of which will be fully hereinafter set forth, and the essential features of my device pointed out particularly in the claim.

In the accompanying drawings, forming a part of this specification, Figure 1 is a view in perspective of a part of the running-gear of a vehicle, showing my improved device attached to the rear axle and supporting the rear end of the side springs. Figs. 2, 3, and 4 are enlarged details of the supporting-arm, the link-coupling, and the nut for securing the link to the arm. Fig. 5 is a longitudinal section through the supporting-arm, coupling-link, and axle. Fig. 6 is an inverted view of the supporting-arm.

As indicated in the drawings, A represents the head-block of a vehicle, S S the side springs, B the rear crank-axle, C the arched supporting-arm, and D the link-coupling.

The forward ends of the springs S are secured to the head-block A by means of the eye-plates and clip-fastenings, as shown in Fig. 1; but, there being nothing new in this arrangement, it will require no special mention.

To the end portions B'' of the rear axle, and by means of the clips $ff$, is secured the supporting-arms C, having the arched projecting end provided with the spindle H, the inner end of said spindle being screw-threaded to receive the nut $a$.

The under face of the arm C is provided with the spur $z$ and the recess G. The upper face of the portion B'' of the axle is indented to receive the spur $z$ on the under face of the arm. (See Fig. 5.) This prevents the arm from working in and holds the inner curved face of said arm flush with the inner shoulder of the upright portion B' of the axle, as clearly shown in Fig. 5. The recess G in the under face of the arm C is simply to lighten the casting.

The link D is secured to the arm C by passing the spindle H of said arm through the eye $o$ in said link and securing it therein by means of the nut $a$. (See Figs. 1 and 5.) The depending ends $c\ c$ of the link are provided with the holes $t\ t$. (See Fig. 3.) The spring S is coupled to the link D by placing the eye $s$ in the end of said spring between the depending ends $c$ of the link and so as to register with the holes $t$ therein. The bolt $b$ is then passed through said holes $t$ and eye $s$, receiving on its inner end the nut $e$, as clearly shown in Figs. 1 and 5.

It will be observed that the above-described arrangement of parts freely permits of the further longitudinal extension of the springs when sustaining the weight of the occupants of the vehicle. As the springs straighten, the link D will oscillate on the spindle H of the arm C, allowing a free and perfect action of the springs and maintaining the bearings at all times nearly on a line with the vertical center of the axle, overcoming the twisting strain on the axle where, in the employment of side springs, said side springs are suspended from the side of the axle, as in common use. It will also be apparent that any form of side spring may be used. Short half-springs may be employed instead of the long spring shown in the drawings.

Having thus fully set forth my invention, what I claim as new, and desire to secure by Letters Patent, is—

In combination with the running-gear of a vehicle, the crank-axle, the arm C, mounted on the end portion B'' of said axle, the inner and upward projecting end of said arm carrying the link D, said link supporting the end of the spring at right angles to and over the vertical center of the axle, for the purposes specified.

In testimony whereof I affix my signature in presence of two witnesses.

WILLIAM D. RUMSEY.

Witnesses:
J. W. FINNEY,
E. S. WHEELER.